Sept. 12, 1933.    W. J. ENGLE    1,926,976

SOIL WORKING MACHINE

Original Filed July 10, 1930    2 Sheets-Sheet 1

Inventor

W. J. Engle

By Morrison, Kennedy & Campbell

Attorneys

Sept. 12, 1933.  W. J. ENGLE  1,926,976
SOIL WORKING MACHINE
Original Filed July 10, 1930   2 Sheets-Sheet 2

Inventor
W. J. Engle,
By Morrison, Kennedy & Campbell
Attorneys

Patented Sept. 12, 1933

1,926,976

UNITED STATES PATENT OFFICE 1,926,976

SOIL WORKING MACHINE

Washington J. Engle, Urbana, Ill., assignor of one-half to Abner R. Knight, Urbana, Ill.

Application July 10, 1930, Serial No. 467,068
Renewed July 28, 1932

11 Claims. (Cl. 55—12)

This invention relates to improvements in soil-working machines and more particularly to that type of machine wherein one or more sets of soil-working instrumentalities are mounted on a frame adapted to be pulled over the surface of the ground like a sled by a suitable source of motive power.

The primary object of my invention is to provide a machine propellable with the minimum of power and draft, which will pulverize the soil to a considerable depth without disturbing the arrangement of the soil strata, and to otherwise prepare the soil for cultivation in one operation by destroying or by eliminating weeds, roots and surface growth. It will readily be seen that considerable time and power will be saved by my invention which completely prepares the soil in one operation and thereby eliminates the necessity of successive working the soil with a plurality of different instrumentalities, no one of which performs more than one or several of the steps necessary in preparing the soil for cultivation.

An important feature of my invention consists in mounting in a heavy unitary frame a plurality of selected instrumentalities adapted to flatten surface growth, chop up such surface growth and roots extending below the surface, slice the soil vertically and horizontally without disturbing the general arrangement of the surface and sub-surface soil, and cut weeds at their roots and thus destroy them. By providing a metal frame of heavy construction, sufficient weight is impressed upon the various soil-working instrumentalities as to cause them to cut to a depth considerably greater than that which is accomplished by present day machines.

Another essential feature of my invention resides in the utilization of rollers which are essential parts of my soil-working apparatus as means for rendering my machine readily mobile by an arrangement which allows the soil-working instrumentalities and the frame to be raised clear of the ground and transported on the rollers.

In connection with my machine, which is designed to accomplish the above purposes, it is a further purpose of my invention to provide means whereby I am able to act upon the soil to any desired depth.

It is a further purpose of my invention to provide in connection with a machine having the above characteristics, means cooperating with the weight of the frame to cause the soil-working instrumentalities to operate uniformly at any desired depth below the surface of the soil under all ordinary conditions.

It is a still further object of my invention to provide means which will automatically raise the frame and hence the soil-working instrumentalities clear of the ground in turning corners.

In connection with this last object, it is my further purpose to provide means in association with the lifting mechanism to lock the frame in its raised position so that the machine may be transported from one place to another without injury to the earth-working instrumentalities.

It is still another purpose of this invention to provide means for rendering the automatic lifting mechanism inoperative.

To maintain the highest operative efficiency of the soil-working instrumentalities, it is my purpose to provide means adapted to prevent them from becoming clogged.

The drawings annexed hereto illustrate a preferred embodiment of my invention, but it is to be understood that I do not intend to limit myself to the details of construction therein disclosed inasmuch as the invention is capable of a wide range of utilization, modification and equivalency other than herein revealed.

In these drawings,

Fig. 3 is a plan end view of a portion of the automatic lifting mechanism.

Figure 1:
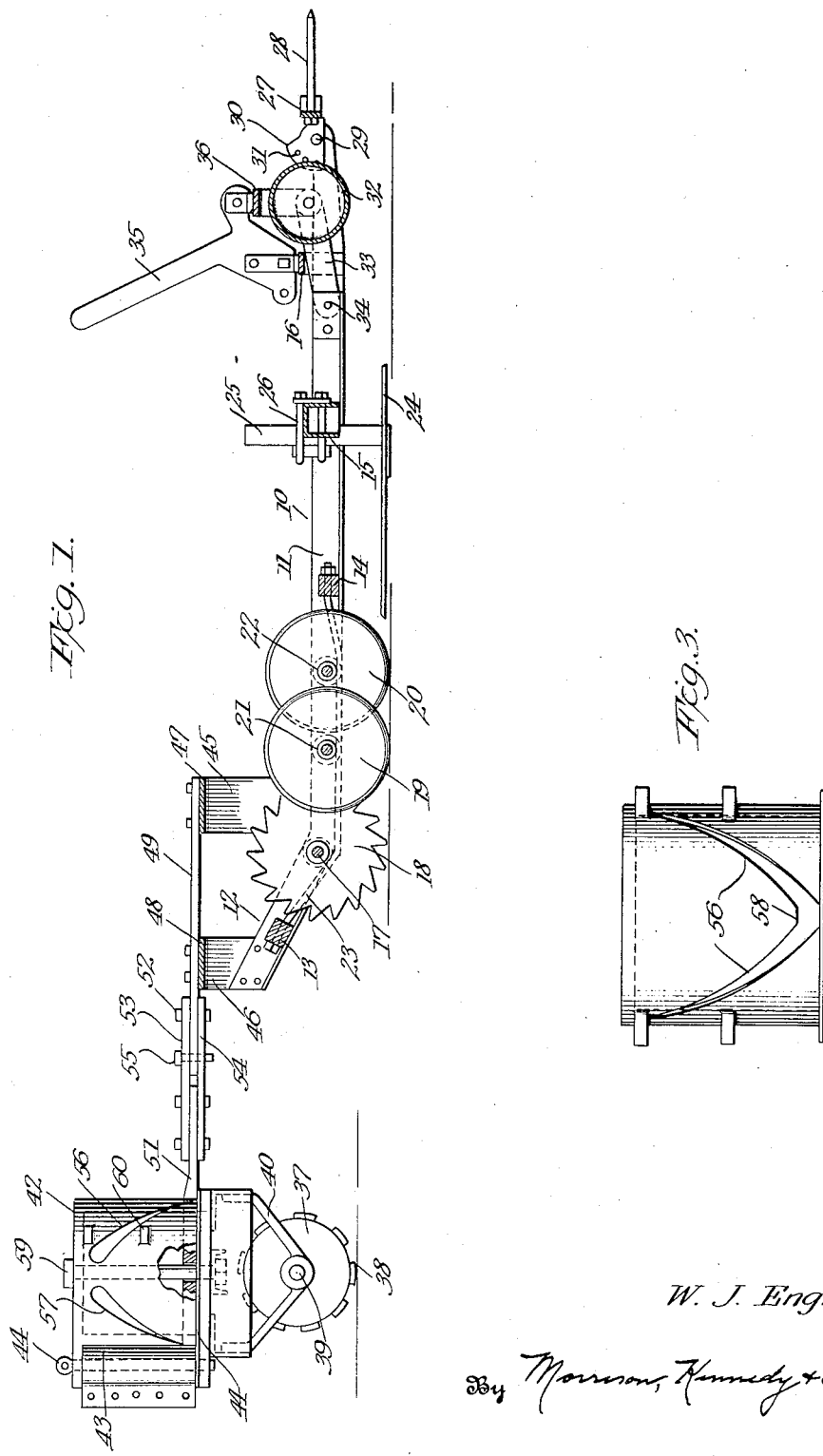
Fig. 1 is a view in vertical section of my soil-working machine, together with the automatic means adapted to lift the machine clear of the ground.
Figure 2:
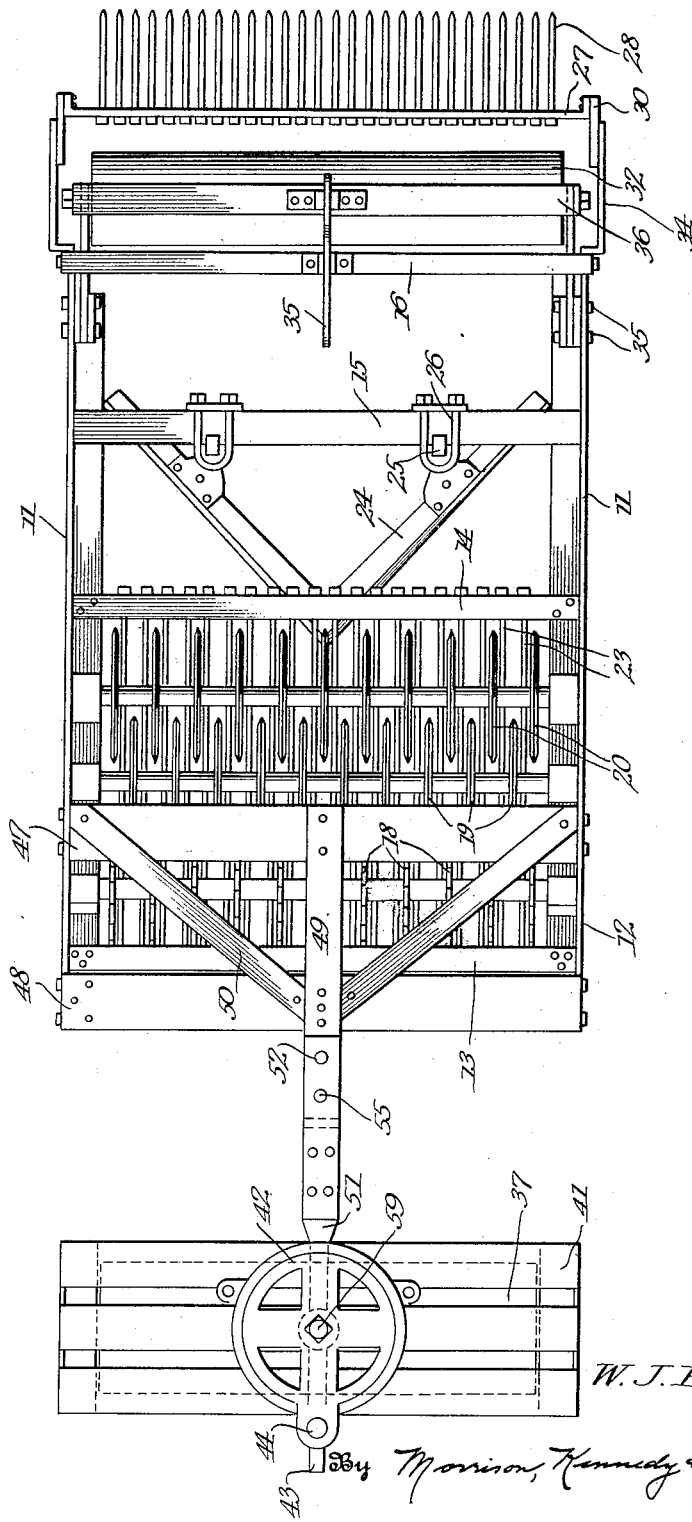
Fig. 2 is a horizontal plan view corresponding to Fig. 1.

Referring to the drawings, the reference numeral 10 in Fig. 1 indicates generally the frame of my soil-working machine, which comprises a pair of longitudinally extending beams 11, the ends 12 of which beams are bent upwardly so that the beams may easily slide over the ground like runners. As more clearly shown in Fig. 2, the runners 11 are connected together by a series of cross beams 13, 14, 15 and 16. Supported by the frame are a series of earth-working instrumentalities which cooperate to pulverize the soil. Mounted towards the forward end of the frame on a shaft 17 are a plurality of toothed flat discs 18, the teeth being so disposed that their sloping or cutting edge will bear down upon and sever stalks and branches on the surface of the ground and also roots below the surface as the machine moves forward. Journaled on the frame behind the saw-toothed discs are two sets of flat cutting discs 19 and 20, mounted on shafts 21 and 22 in staggered relation with respect to the saw-toothed discs 18. The ends of these shafts are journaled in suitable bearings on the side members of the frame. In order that the above instrumentalities may be kept clean and prevented from clogging by reason of stalks, roots or other matter which might be forced up between the discs and around their shafts, and for the further purpose of keeping flat such surface matter so that the same may be cut by the element 18, I have provided a grid which comprises a series of bars 23 fastened at their respective ends to the cross-frame members 13 and 14. As best shown in Fig. 2, these bars lie in the spaces between the three sets of staggered discs 18, 19 and 20. While I am aware that heretofore it has been proposed to provide a grid comprising a series of spaced bars, such as I have just described, the practice has been to locate such devices between the discs above the shaft upon which the discs rotate. Such construction serves the purpose of keeping the sides of the discs clean by preventing dirt from adhering to their sides, but such devices will not prevent the discs from clogging. I therefore propose to locate my cleaning bars below the shafts supporting the discs and preferably to bend them to conform to the general shape of the side runners of the frame as shown in Fig. 1. It will be evident that such construction will operate to prevent foreign matter from winding around the shafts of the discs, and by reason of their location in line with the lower edge of the runners, will keep such matter flat on the ground while the discs are cutting them into small pieces. Located towards the rear of the frame is a horizontally V-shaped slicing blade 24 mounted on vertical posts such as 25, which posts are in turn adjustably clamped to the cross-member 15 by means of U-bolts 26, so that the slicing blade may be raised or lowered with respect to the frame, according to the level below the surface of the ground at which it is desired that this instrumentality operate. Mounted at the rear end of the frame on a bar 27 is a rake comprising a series of teeth 28. As shown in Fig. 1, the bar 27 is pivotally mounted on the frame at 29 by means of plates 30, which have a series of holes 31 corresponding to holes in the frame, whereby the rake element may be rigidly held by means of pins in the proper holes in any desired adjusted position.

It is desirable as heretofore pointed out that the frame be constructed of heavy metal beams in order that the soil-working instrumentalities may at all times cut to the desired depth. When, however, it is desired to cut to less than a maximum depth, it is necessary to provide means for taking a portion of the weight of the frame off the soil-working instrumentalities. I accomplish such result by providing a roller 32 rotatably supported by arms 33 which are pivotally connected with the frame at 34. Vertical adjustment of the roller is effected by means of a lever 35 supported on the cross-frame member 16 which is pivotally connected with the roller-supported member 36. While serving to carry part of the weight of the frame, it will be clear that the roller will also pulverize any lumps which may remain after the other instrumentalities have acted upon the soil. The rake 28 is adapted to gather up any foreign matter on the surface of the soil and may serve an additional purpose in further pulverizing the soil.

For the purpose of flattening foreign matter such as weeds and stalks before the soil-working instrumentalities become operative, I have provided a heavy roller 37 which, as shown in Fig. 1, comprises a series of slats 38 equally spaced about a plurality of circular supports mounted on a shaft 39. This roller is mounted independently of the main frame for reasons shortly to be described.

Mounted above the roller 37 on suitably journaled supports 40 is a platform 41. Rigidly secured to the platform is a strong metallic drum 42 which forms an essential part of my frame lifting mechanism. At the top and bottom of the forward side of the drum, I have located extensions between which is positioned a clevis 43 adapted to be attached to the source of motive power. Said clevis is pivotally secured between the drum extensions by a break pin 44. In order that any source of motive power may be used, a plurality of holes are provided in the clevis so that the coupling may be effected between the clevis and the source of power selected at the proper height.

Besides serving the purpose of mashing down vegetation so that it may be cut up by the various cutting devices, the roller 37 serves to support the forward end of the frame of my machine. Mounted at the forward ends of the side pieces 11 of the frame are vertical members 45 and 46 to the upper ends of which are secured cross-members 47 and 48. Secured to the cross-members 47 and 48 in line with the longitudinal axis of the machine is a coupling member 49 braced by reinforcing members 50. An extension 51 of the coupling member is hingedly connected thereto by means of the pivot bolt 52 and the plates 53 and 54. In order that the two parts of the coupling member may be made rigid, a locking pin 55 is provided to seat in corresponding holes in the plates 53 and 54 and the member 49. The coupling member extension extends through suitable recesses in the forward and rear end of the drum 42 and is ordinarily supported by the platform 41.

In order that the soil-working instrumentalities mounted on the main frame of my machine may be automatically removed from the ground when it is necessary to turn corners, I have provided novel means whereby when the source of power urges the forward roller 37 to turn so that its direction of movement becomes out of alinement with the longitudinal axis of the frame, the forward end of the frame will be lifted. Such means comprises a series of cam tracks or slots 56 and 57, which, as most clearly shown in Fig. 3, run from the lower end of the forward and rearward sides of the drum upwardly at an angle of approximately forty degrees and terminate on the lateral sides of the drum at the upper end thereof. The recesses in the forward ends of the drum through which the coupling member extension 51 extends forms the point of jointer of the cam tracks. In order that the coupling pole may be locked when the machine is operating on a straight-a-way pull, and thus prevent the member from riding upwardly on the cam tracks where the ground is rough or hard, the point of joinder of the lower ends of the cam tracks is flattened as shown at 58. Passing through the center of the drum and through a hole in the coupling member extension 51 is a bolt or pivot 59.

Assuming that the pin 55 is in place so that the extension 51 is rigid with respect to the coupling member 49, it will be apparent in view of the construction just described that when the power device changes its direction of forward movement, the forward roller and the drum will also tend to change direction, thus causing the coupling member extension 51 to pivot and slide upwardly on the bolt 59 as the coupling member rides upwardly in the oppositely disposed sections of the rearward and forward cam tracks 56 and 57. Since the extension member 51 is rigid with respect to the coupling member 49, the frame and the various instrumentalities mounted thereon will be lifted from the ground. Of course, in order that the instrumentalities may be entirely freed from engagement with the ground, it will be necessary that the rear roller 32 be lowered so that the frame will pivot on such roller when the forward end of the frame is raised upwardly by the lifting mechanism associated with the forward roller. When the direction of movement of the power means, and, hence, the forward roller, again becomes alined with the longitudinal axis of the frame, the coupling extension 51 will ride downwardly in the cam slots until the said member again rests on the platform and the instrumentalities re-engage with the ground.

Not only does my lifting device function to free the soil-working instrumentalities from the ground when the direction of the machine is being changed, but it serves the further purpose in cooperation with the rear roller of allowing the machine to be transported from place to place by suspending the frame between the two rollers. To accomplish this result, it is merely necessary to cause the lifting mechanism to raise the coupling extension 51 to its upper extremity and to lock the member in such position by inserting a suitable pin in the opening 60 provided in the drum for that purpose. Further operation of the lifting mechanism is prevented by removing the locking pin 55 in the coupling member so that the frame will pivot with respect to the forward roller about the point 52 instead of about the coupling bolt 59.

I claim:

1. A soil-working machine including an implement-carrying frame, a roller associated with the frame, and means operative when the direction of movement of the roller varies with respect to the longitudinal axis of the frame for vertically adjusting the frame.

2. A soil-working machine including an implement-carrying frame, a roller, means in connection with the roller for pivotally supporting the frame, and means associated with said last-mentioned means for vertically adjusting the frame as the direction of movement of the roller varies with respect to the longitudinal axis of the frame.

3. A soil-working machine including an implement-carrying frame, a roller, means in connection with the roller for pivotally supporting the frame, means associated with said last-mentioned means for vertically adjusting the frame when the direction of movement of the roller varies with respect to the longitudinal axis of the frame, and means to prevent vertical adjustment of the frame when the direction of movement of the frame is in alinement with the longitudinal axis of the frame.

4. A soil-working machine including an implement-carrying frame, a roller, means in connection with the roller for pivotally supporting the frame, means associated with said last-mentioned means for vertically adjusting the frame when the direction of movement of the roller varies with respect to the longitudinal axis of the frame, and means for rendering said frame-adjusting means inoperative.

5. A soil-working machine including an implement-carrying frame, a roller, means in connection with the roller for pivotally supporting the frame, means associated with said last-mentioned means for vertically adjusting the frame when the direction of movement of the roller varies with respect to the longitudinal axis of the frame, means for locking the frame in adjusted positions, and means adapted to render the frame-adjusting means inoperative.

6. A soil-working machine including an implement-carrying frame, a roller adapted to pivotally support one end of the frame, a second roller for supporting the other end of the frame, and means for adjusting the respective rollers vertically with respect to the frame, the adjusting means in connection with the first-mentioned roller being automatically operative in accordance with the variation in direction of movement of said roller with respect to the longitudinal axis of the frame.

7. A soil-working machine including an implement-carrying frame of the sled type adapted to be supported by and drawn along the ground, rollers associated with the respective ends of the frame, at least one of the rollers being pivoted with respect to the frame, and means operative upon change in direction of movement of one of the rollers with respect to the longitudinal axis of the frame for vertically adjusting the frame.

8. A soil-working machine including a frame of the sled type, soil-working implements supported in the frame in operative position, rollers associated with the ends of the frame, and means operative when the direction of movement of at least one of the rollers varies with respect to the longitudinal axis of the frame for elevating the frame between the rollers to render the implements inoperative.

9. A soil-working machine including a frame, soil-working implements supported in said frame, a roller pivotally connected with the frame, and means automatically operative when the direction of movement of the roller varies with respect to the longitudinal axis of the frame for raising the frame and freeing the implements from contact with the soil.

10. A soil-working machine including a frame, soil-working implements supported in said frame, a roller pivotally connected to said frame, and means automatically operative when the direction of movement of the roller varies with respect to the longitudinal axis of the frame to elevate one end of the frame and swing the frame about its other end to free the implements from engagement with the soil.

11. A soil-working machine comprising an implement-carrying frame, a roller associated with said frame, and means operative when the direction of movement of the roller varies with respect to the longitudinal axis of the frame for vertically adjusting the frame, said means comprising a drum supported by the roller, spirally-extending cam slots in said drum, and an extension member secured to the frame and adapted to engage the cam slots.

WASHINGTON J. ENGLE.